US008235461B2

(12) United States Patent
Cohen (10) Patent No.: US 8,235,461 B2
(45) Date of Patent: Aug. 7, 2012

(54) VENTILATED SEAT USING SHOCK ABSORBING MATERIAL

(76) Inventor: Eli Cohen, Lincoln Park, NJ (US)

( * ) Notice: Subject to any disclaimer, the term of this patent is extended or adjusted under 35 U.S.C. 154(b) by 0 days.

(21) Appl. No.: 12/985,118

(22) Filed: Jan. 5, 2011

(65) Prior Publication Data

US 2011/0175416 A1    Jul. 21, 2011

Related U.S. Application Data

(60) Provisional application No. 61/297,036, filed on Jan. 21, 2010.

(51) Int. Cl.
     *A47C 7/72*        (2006.01)
(52) U.S. Cl. ............ 297/180.13; 297/180.14; 297/180.1
(58) Field of Classification Search ............. 297/180.13, 297/180.14, 182, 148–155, 180.1
See application file for complete search history.

(56) References Cited

U.S. PATENT DOCUMENTS

| | | | | |
|---|---|---|---|---|
| 5,002,336 A | * | 3/1991 | Feher | 297/180.13 |
| 6,109,688 A | * | 8/2000 | Wurz et al. | 297/180.14 |
| 6,273,810 B1 | * | 8/2001 | Rhodes et al. | 454/120 |
| 6,276,752 B1 | * | 8/2001 | Conte | 297/182 |
| 6,776,453 B1 | * | 8/2004 | Floyd, Jr. | 297/180.12 |
| 6,848,742 B1 | * | 2/2005 | Aoki et al. | 297/180.14 |
| 7,475,938 B2 | * | 1/2009 | Stoewe et al. | 297/180.14 |
| 7,637,569 B2 | * | 12/2009 | Krobok et al. | 297/284.2 |
| 7,735,932 B2 | * | 6/2010 | Lazanja et al. | 297/452.47 |
| 2003/0102699 A1 | * | 6/2003 | Aoki et al. | 297/180.14 |

* cited by examiner

*Primary Examiner* — David Dunn
*Assistant Examiner* — Erika Garrett
(74) *Attorney, Agent, or Firm* — Antonio Papageorgiou; Ostrow Kaufman LLP (57) ABSTRACT

In at least one embodiment, a shock absorbing ventilated seat is provided that includes a seat portion; and a back portion adjustably hinged to the seat portion. At least one of the seat and the back portions include a planer sheet of shock absorbing material located therein. The shock absorbing material has a top layer, a bottom layer, and a plurality of pairs of ribs that couple the top layer to the bottom layer so as to create a plurality of channels in the material. The top layer has a plurality of perforations therein that communicate with the plurality of channels, each of the plurality of channels having an opening on an end of the material coupled to an air source that cause air to pass through the openings of the channels and exit through the perforations in the material.

18 Claims, 12 Drawing Sheets

FIG. 1.
(RELAXED STATE)

FIG. 2.
(COMPRESSED STATE)

FIG. 3.
(RELAXED STATE)

FIG. 4.
(COMPRESSED STATE)

FIG. 5.
(RELAXED STATE)

FIG. 6.
(COMPRESSED STATE)

VENTILATED SEAT USING SHOCK ABSORBING MATERIAL

The present application claims priority to U.S. Provisional Patent Application No. 61/297,036, filed Jan. 21, 2010, which is hereby incorporated herein by reference.

BACKGROUND OF THE INVENTION

The present application relates to ventilated seats and more particularly to ventilated seats using shock absorbing materials.

Various types of ventilated seats exist, such as car seats; however, none of these seats use shock absorbing material to provide the vented air thereto. Accordingly, there is a need for vented seats that are not so limited.

SUMMARY OF THE INVENTION

In at least one embodiment, a ventilated seat is provided that includes a seat portion; and a back portion adjustably hinged to the seat portion. At least one of the seat and the back portions includes a planer sheet of shock absorbing material located therein, the shock absorbing material having a top layer, a bottom layer, and a plurality of pairs of ribs that couple the top layer to the bottom layer, the pairs of ribs extent through the material so as to create a plurality of channels therein, the top layer having a plurality of perforations therein that communicate with the plurality of channels, each of the plurality of channels having an opening on an end of the material coupled to an air source that cause air to pass through the openings of the channels and exit through the perforations in the material.

In at least one embodiment, the ventilated seat includes a seat cover located over the material, the seat cover having perforations therein that communicate with the perforations of the material. In at least one embodiment, a location of the perforations in the seat cover match a location of the perforations of the material.

In at least one embodiment, the air source it at least one of an air conditioner and a heating system.

In at least one embodiment, the ventilation portion of the seat is a seat cover that fits over a complete seat.

In at least one embodiment, the ventilated seat includes a feeder tube having a plurality of nipples, each of the nipples interface with an opening on the end of the material, the feeder tube coupled to the air source.

In at least one embodiment, the channels traverse the material from a first end to a second end, and the openings in the channel are at a first end and at the second end the channels are closed therewith allowing air passing through the channel and escape only through the perforations in the top layer.

In at least one embodiment, the material has a drain for condensation in at least one of the channels.

In at least one embodiment, the seat portion and the back portion include the layer of material.

In at least one embodiment, the plurality of channels in the material extend continually from a front of the seat portion to a top of the back portion. The ventilated seat may include a feeder tube having a plurality of nipples, each of the nipples interface with openings on the bottom layer of the material, the feeder tube coupled to the air source, the channels closed at a first end of the material at the front of the seat portion and at a second end of the material at the top of the back portion, therewith allowing air passing through the channels and escape only through the perforations in the top layer. In at least one embodiment, the nipples interface with openings on the bottom layer of the material at an intersection of the seat portion with the back portion.

In at least one embodiment, a first layer of material is located in the seat portion and a separate second layer of material is located in the back portion, the plurality of channels in the material extend from a front of the seat portion to a back of the seat portion, and from a bottom of the back portion to a top of the back portion. The ventilated seat may include a feeder tube having a first set of a plurality of nipples and a second set of a plurality of nipples, each of the sets of nipples interface with openings in one of the layers of materials, the feeder tube coupled to the air source, the channels closed at a front of the seat portion and at a top of the back portion, therewith allowing air passing through the channels and escape only through the perforations in the top layer. In at least one embodiment, the nipples interface with openings on the bottom layer of the material at an intersection of the seat portion with the back portion.

In at least one embodiment, each of the ribs of the pair of ribs is bowed oppositely with respect to another of the pair of ribs, therewith creating alternating shaped channels. In at least one embodiment, at least one channels of the alternating shaped channels has a circular cross sectional shape.

DETAILED DESCRIPTION OF THE INVENTION

The present application provides personal safety and comfort products, such as helmets, pads, guards, etc., with energy absorbing features. Although particular safety products may be discussed herein, it is understood that the energy absorbing features of the present application may be used in other products. Accordingly, this application is not limited to any one or more particular safety products.

Figure 1:
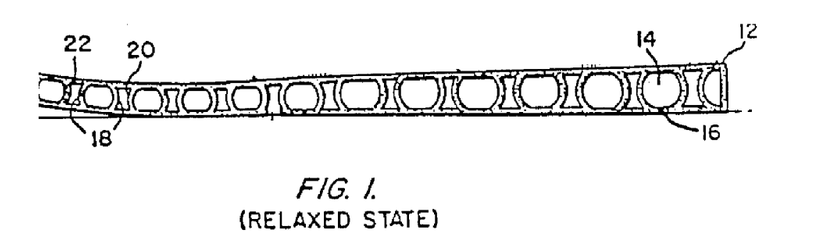
FIG. 1 is a cross section view of a shock absorbing material according to at least one embodiment of the materials disclosed herein in a relaxed state.

In at least one embodiment, the energy absorbing features affixed to the personal safety and/or comfort devices is a resilient pad or material having structures therein that absorb the energy from an impact, hereinafter referred to as a material. Referring to FIG. 1, the energy absorbing material, according to at least one embodiment of the materials disclosed herein, includes a top layer 12 and a bottom layer 16. The top and bottom layers 12, 16 may be disposed in relation to each other to create a wedge shape as shown, or parallel to each other. The top and bottom layers 12, 16 are connected with a plurality of pairs of ribs 18. As shown, each of the ribs of the pair of ribs 18 is bowed oppositely with respect to one another. In this respect, the shape of the ribs 18 creates a series of alternating shaped voids that extend through at least a portion of the length or width of the material. Although not crucial, each pair of ribs is constructed from a rubber, rubber-like, or similar material that is flexible and resilient. Harder materials may be used for greater load bearing capacity. The top and bottom layers 12, 16 may be made of a material different than that of the ribs or all of the components of the material 12, 16, 18 can be extruded or molded as an entire unit.

Figure 2:
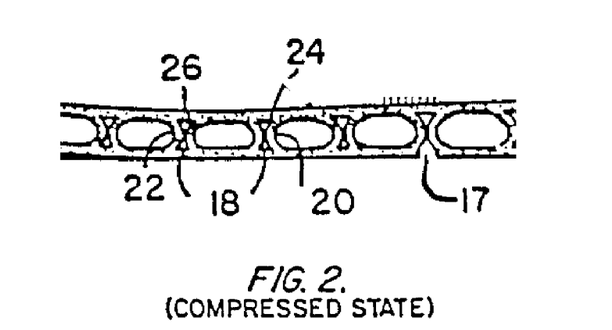
FIG. 2 is a cross section view of the shock absorbing material of FIG. 1 in a compressed state.

When a normal force is applied the mat, as is shown in FIG. 2, each of the ribs initially deflects. A relatively large force is needed to initially deflect the ribs, but as the ribs are deflected to a greater extent, relatively less force is needed to deflect the ribs further. Each pair of ribs is separated from adjacent pairs of ribs such that after a predetermined force has been applied, one of the pairs of ribs 18 intrudes upon an adjacent rib 20 of a second pair of ribs at 24, while the second rib of the pair 18 intrudes upon its adjacent rib 22 of a third pair of ribs at 26. From this point on, as additional force is applied normal to the mat, the ribs will be compressed axially, which will require a larger force. The material therefore acts as a three stage progressive energy absorbing material. That is, a first force is necessary for initial deflection, a second force that is less than the first force for additional deflection as a result of the buckling of the ribs 18, and a third force that is greater than the second force and likely greater than the first to compress the ribs 18. The ultimate result is a material with superior energy absorbing properties which is light, inexpensive, and soft.

Figure 3:
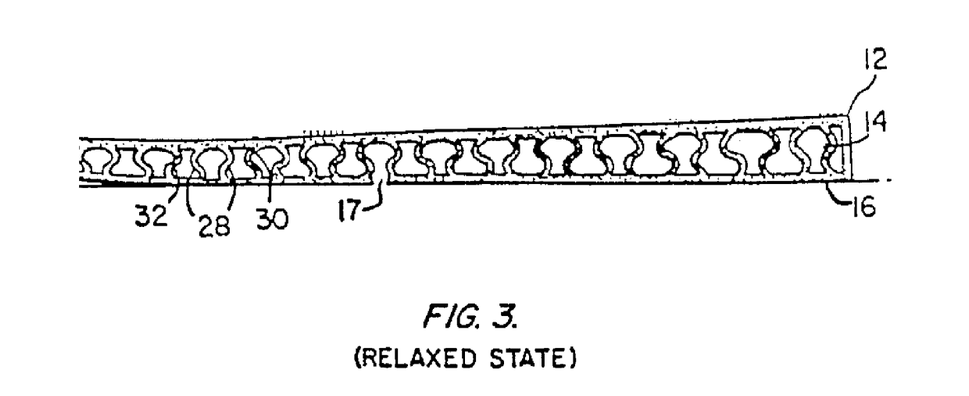
FIG. 3 is a cross section view of a shock absorbing material according to at least one other embodiment of the materials disclosed herein in a relaxed state.
Figure 4:
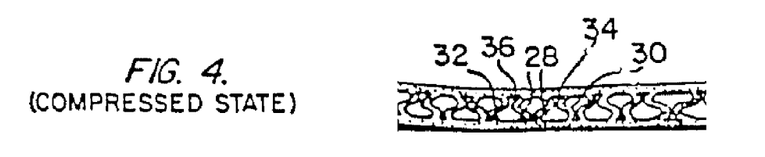
FIG. 4 is a cross section view of the shock absorbing material of FIG. 3 in a compressed state.

FIG. 3 shows a material in which each of a pair of ribs 28 contains one forwardly facing contoured "S"-shaped rib and an oppositely faced contoured "S"-shaped rib. As was true with respect to the material described in FIGS. 1 and 2, each of the ribs is initially deflected until adjacent ribs 30 and 32 abut at 24 and 26, at which point any additional force applied to the material would act as a force to compress the ribs 28 of the material 14, as is shown in FIG. 4.

Figure 5:
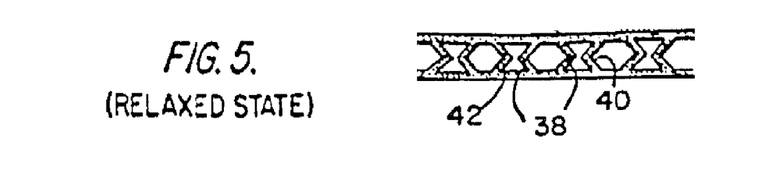
FIG. 5 is a cross section view of a shock absorbing material according to at least one other embodiment of the materials disclosed herein in a relaxed state.
Figure 6:
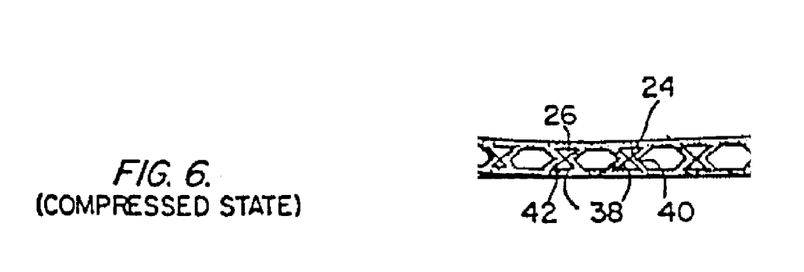
FIG. 6 is a cross section view of the shock absorbing material of FIG. 5 in a compressed state.

Similarly, FIG. 5 shows a material 10 provided with a plurality of pairs of ribs 38, each pair of ribs forming a "diamond" design. Furthermore, as was true with respect to the materials shown in FIGS. 1-4, this "diamond" design would initially deflect when force is provided normal to the material until adjacent ribs 40 and 42 intrude upon the ribs 38 at 24 and 26, respectively, at which time the ribs 38 of the mid-material 14 would compress, as is shown in FIG. 6. Each of the top or bottoms layers 16 can be provided with one or more transverse slits 17, to reduce the effort required to flex the material during use.

Although the exact dimensions of the rib and material size are not crucial, it has been determined that the ribs may be about ⅛ inch in thickness, and these last several ribs may be 3/16 inch in thickness. Furthermore, the spacing between ribs which are ⅛ inch in thickness is ¼ inch in the relaxed state and the spacing between ribs which are 3/16 inch in thickness are slightly less than ¼ inch. The purpose of the slightly thickened ribs is to provide additional or different impact resistance on different areas of the material. Additionally, the top layer 12 could be 3/32 inch in thickness and the bottom layer may be ⅛ inch in thickness. The overall thickness of the material may be ⅜ inch, which allows the material to be stacked to produce a thickness of ¾ inch. It is understood that the dimensions disclosed herein can be made smaller and/or larger along the entire material or at some portions to achieve the desired energy absorbing properties. Additionally, the spacing between each pair of ribs as well as the thickness of the ribs and the length of the ribs can be increased or decreased depending upon the weight of the individual, or the particular activity for which the material is designed. The durometer value of the ribs can also be altered to customize the cushioning to an individual's weight and/or the activity. It is this interaction of each pair of ribs with their adjacent ribs which produces the particular cushioning connection and not the action of any hydraulic or pneumatic force.

Figure 7:
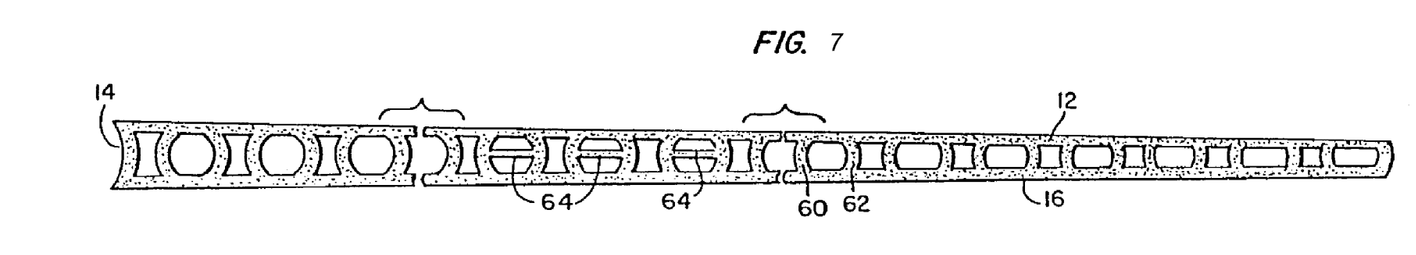
FIGS. 7 and 8 are cross section views of a shock absorbing material with bridging elements between ribs according to at least one other embodiment of the materials disclosed herein.
Figure 8:
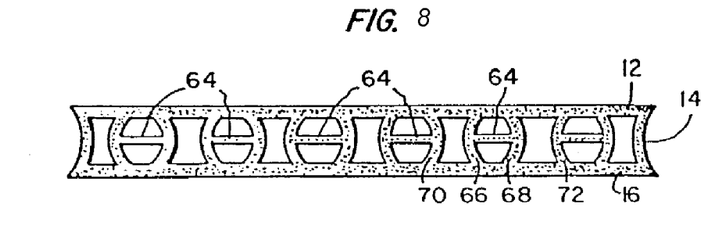
Figure 9:
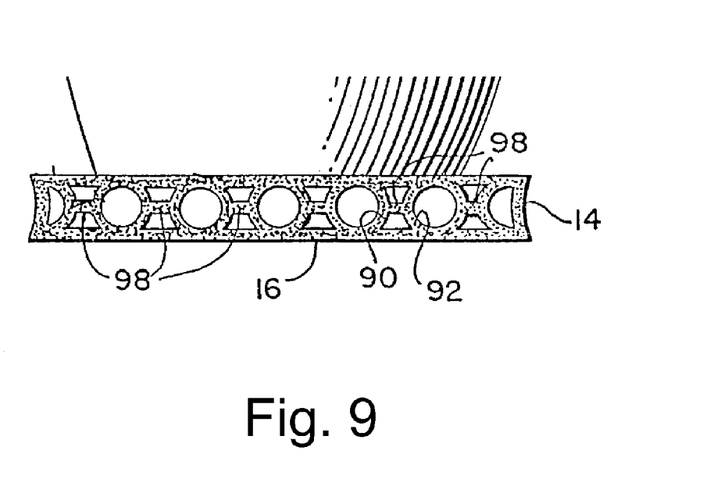
FIG. 9 is a cross section view of a shock absorbing material with bridging elements between ribs according to at least one other embodiment of the materials disclosed herein.

FIG. 7 shows a side-elevation of the material 14 provided with the type of ribs 60, 62 shown in FIGS. 1 and 2. A thin elastic bridging element 64 is provided between each of the ribs 60, 62 provided between pairs of ribs. Some or all of the pairs of ribs may contain similar bridging elements. The bridging elements may be thinner than each individual rib and the elastic nature of the element allows them to be stretched when the ribs 60, 62 are initially deflected and then compressed to provide another complementary cushioning force to that of the deflection of the ribs. Furthermore, as shown in FIG. 8, if the ribs may be spaced further apart than is shown in FIG. 7, the bridging elements 64 are used only in conjunction with the deflective forces of the ribs 66, 69, 70 and 72. In this situation, regardless of the amount of pressure or force which is applied to the mat, rib 66 should not abut rib 70 and similarly, rib 68 should not abut rib 72. The bridging of the ribs may be along the major void, i.e., the circular void, as shown in FIGS. 7-8 and/or preferably along the minor voids, i.e., the hourglass shaped void, as shown in the preferred embodiment of FIG. 9. That is, the bridging element 98 may be disposed between ribs 90 and 92. In this instance, the bridging member will be in compression to complement the forces that cause the ribs to deflect.

Figure 10:
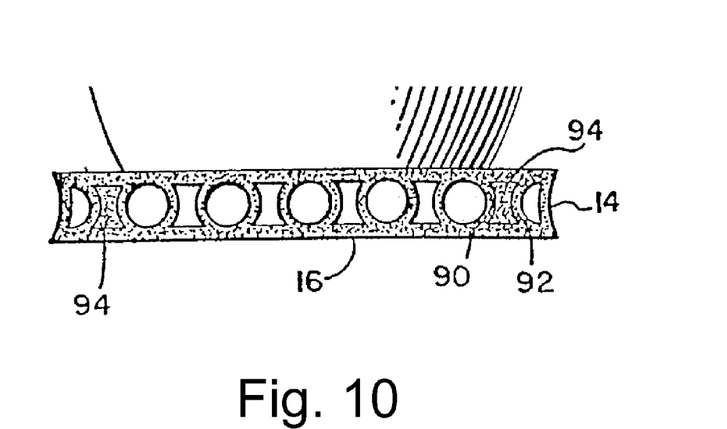
FIGS. 10 and 11 are side cross section and top, partial cut away views, respectively, of a shock absorbing material with solid plugs between ribs according to at least one embodiment of the materials disclosed herein.

In another embodiment, as is illustrated with respect to FIG. 10, a deflection inhibiting insert 94 is provided between two adjacent rib pairs. The insert is inserted into the material between rib 90 of one pair of ribs and rib 92 of an adjacent pair or ribs. The insert 94 is constructed from a compressible material, more, equal, or less compressible than the material that the material is made of, and is adapted to substantially fill the void between ribs 90 and 92. Initially, when force is applied to the mat, the ribs 90 and 92 would deflect until they abut one another and then the ribs would begin to compress. However, when the insert 94 is provided between ribs of adjacent rib pairs, deflection of the ribs is retarded and a differential resistance is created. By utilizing inserts of varying length and placement, as well as material, the resistance can be used to customize the material to a particular individual or specific activity. The deflection inhibiting inserts 94 can be used with various configurations of ribs as long as one rib of each pair is angled with respect to the second rib of each rib pair. Additionally, although the embodiment of FIG. 10 works well with solid inserts 94, these inserts could be replaced by tubular inserts.

Figure 11:
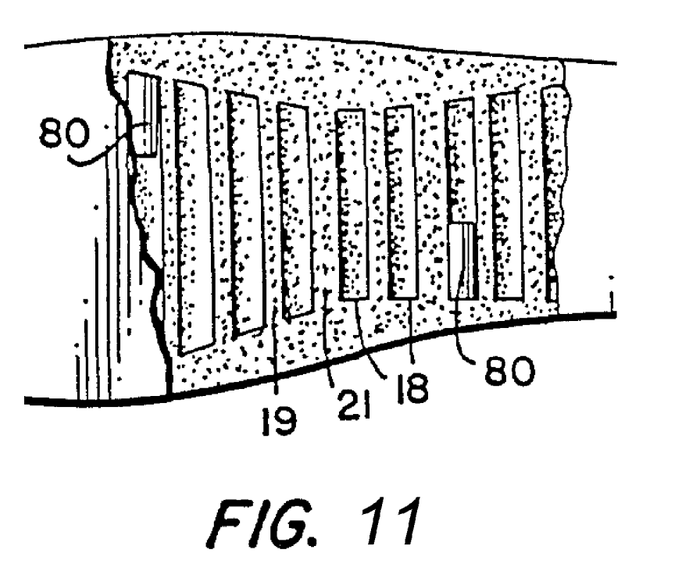
Figure 12:
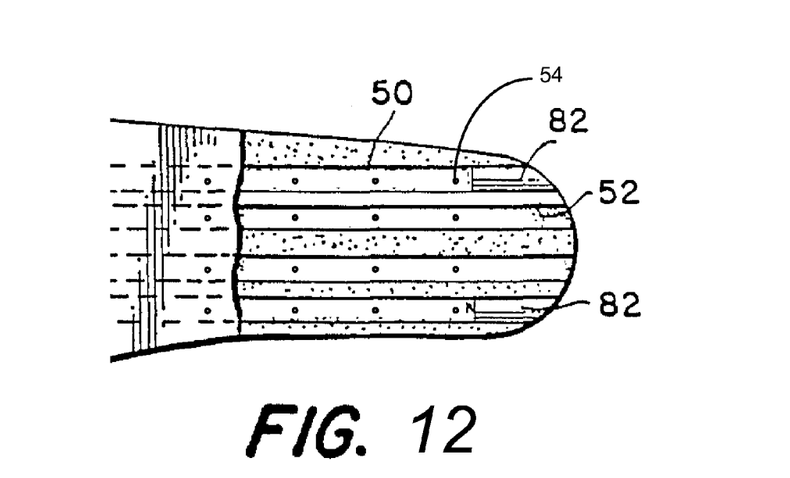
FIG. 12 is a top, partial cut away view of a shock absorbing material with solid plugs and vents between ribs according to at least one embodiment of the materials disclosed herein.
Figure 13:
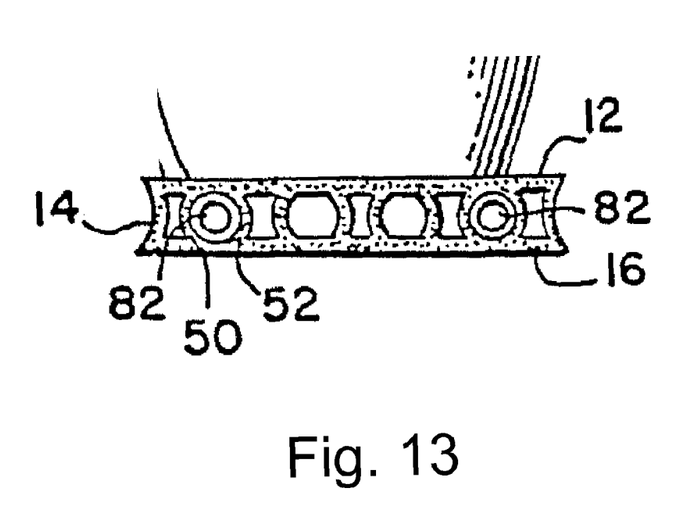
FIG. 13 is a cross section view of a shock absorbing material with tubular plugs between ribs according to at least one other embodiment of the materials disclosed herein.

FIGS. 11-12 illustrate further embodiments with which solid elastomeric or other type of material plug inserts are used to further tailor the energy absorbing properties of the material. As shown in FIG. 11, plugs 80 are placed between the ribs 18 which extend laterally along the width of the material. The plugs 80 could extend along the entire width of the mat, or, as illustrated in FIG. 11, can be provided between the first and second ribs of a rib pair 18 for only a portion of the width. Additionally, as shown, the plugs 80 need not be provided between each pair or ribs, but the placement and length of each plug 80 may be predicated upon the type of activity contemplated as well as the physical characteristics of the user. The plugs 80 may be solid or tubular with a desired thickness as shown in FIG. 13. The plugs 80 may be the same material as that of the mat, or other materials, e.g., with greater or lesser density and/or compressibility, again to achieve the desired energy absorbing properties with the material.

Furthermore, as illustrated in FIG. 12, the ribs 52 may extend along all or a portion of the length of the material. The plugs 82 can be provided between longitudinally extending ribs 50, 52. Similar to the embodiment shown with respect to FIG. 11, tubes 82 need not be provided between all the pairs or ribs, nor must they extend for the entire length of the material. The plugs 82 may also be disposed in the minor voids between ribs of a rib pair and/or the major voids between rib pairs.

In one embodiment, the material includes a plurality of vents 54 that extend through the top and/or bottom layers 12, 16 and into the voids between the pairs of ribs 50, 52. The vents 54 may be disposed in the layers in a predetermined spacing to form a grid type pattern as shown. The grid may have dimensions such that the spacing between longitudinally and laterally adjacent vents is essentially the same. This beneficially allows a plurality of materials to be stacked over each other so that the vents can line up with one another when the ribs of each material are placed parallel or perpendicular to each other. One or more of the ends of the voids between the ribs can be either open or closed, and may include a valve that opens and closes at certain times. In this instance, the air can be forced through the vents as the material is compressed. For example, if that material is used as a mid-sole in a shoe, the vents can force air into the shoe as the person wearing the shoe is walking or running. In this instance, the ribs may run in one direction in one portion of the shoe and in another in the other portion. For example, the ribs may run longitudinally in the heel while the ribs may run laterally in the other parts of the sole.

The vents may be created in the material in a variety of ways. For example, the material may be molded with the vents therein or punched into the top and bottom layers after the material has been extruded or injection molded. The vents may be punched through the layers with an elongated rod that acts as a backing for a punch. In this instance, the rod is placed into the openings in the material between the ribs and the punch is subsequently pressed down into the layers of the material between the flat portion of the rod and the punch thereby forcing a hole therein. The rod may include a relief or hole on the flat side for the punch to pass through as the punch shears the layers of the material and for the waste material to be removed from the site. To create the grid pattern, one or a plurality of rods may be pushed into the voids of the material between the ribs and a plurality of punches in the desired pattern may be pressed against the rod or rods to create vents essentially simultaneously or otherwise. The punches may be disposed on a wheel that rolls over the material as the material is fed through the punch thereby creating a series of holes in the material.

Figure 14:
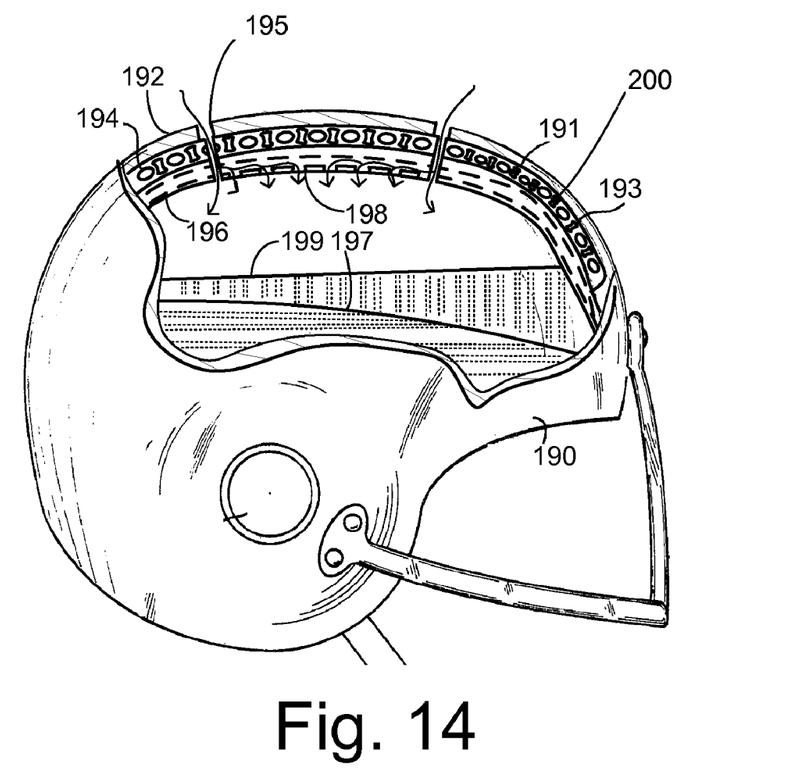
FIGS. 14 and 15 are side, partial cut away view of a personal safety product according to at least one embodiment of the products disclosed herein.

Referring to FIG. 14, in one embodiment the personal safety and comfort product is a helmet, such as a football helmet as shown. It is understood that the present disclosure may be used in various types of helmets and is thus not limited to any one particular implementation. The helmet 190 generally includes an outer shell 192 and at least one layer of the material or materials 191, 196 disclosed herein. The material or materials may be installed, e.g., bonded, adhered, etc., in the helmet in a variety of ways, however, the material or materials are preferably installed in areas susceptible to impact. For example, a layer of material may be installed about the entire interior of the helmet or only portions thereof. That is, the material 191, 196 may be installed in the upper hemisphere of the helmet to protect the top of the head, and/or sections or a band of the material 197, 199 may be installed circumferentially around the rim line of the helmet to cover the temple, forehead, and the back of the head, as shown. Portions of the material 191, 196 may include bridging elements 200 between the ribs, also as shown, to form an H like pattern in the minor voids between rib pairs.

Figure 15:
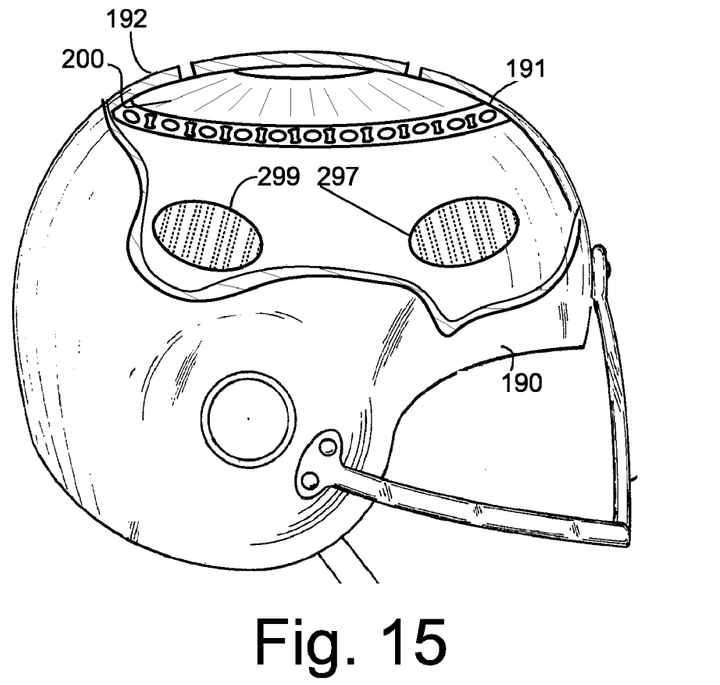

The ribs of the material may be oriented in the helmet in a variety of ways. For example, the ribs in material 191 may be aligned from the left to rights side of the helmet and/or the ribs of the material 196 may be aligned from the front to the back of the helmet, in reverse, diagonally, or in any desired direction. The ribs of the materials 197, 199 on the side of the helmet may be aligned from top to bottom of the helmet, circumferentially, in the reverse, diagonally, or in any desired direction. The ribs 200 may also be aligned as to extend radially outward from the top and the materials may be disposed in discrete sections 297, 297 of the helmet 190, as shown in FIG. 15.

As noted herein, the material or materials include vents therein that allow air to pass into the voids of the material between the ribs. This feature enhances ventilation and allows perspiration to evaporate there through. Ventilation may be accommodated with a hole or holes 195 that perforate through the shell 192 of the helmet 190. The holes 195 may be disposed on various parts of the helmets. For example, the holes 195 may be disposed on the top, front, rear, or a combination thereof. The top holes 195 may allow convection to evacuate warm moist air in the helmet 190 whereas the front holes may allow air to be forced in as the wearer of the helmet is moving and the rear holes may allow that air to escape.

The holes 195 of the helmet 190 are preferably aligned with the vents in at least the top layer of the material or materials installed within the helmet 190. The holes 195 and the vents may be aligned to provide a direct opening though helmet 190 and the materials or they may be staggered to provide an indirect opening through the helmet 190. As shown, the helmet 190 includes a plurality of direct openings and a plurality of indirect openings. That is, air passes indirectly through the hole 195, through a vent in the top layer of the mat, lengthwise through the void between the ribs of the mat, and finally through a vent 198 in the bottom layer of the material that is not in alignment with the vent in the top layer. The number of vents in the top layer may be less than the number of vents in the bottom layer. That is, for every hole in the top layer, there may be a certain number of holes in the bottom layer. For example, for every hole in the top, there may be 8 or 9 holes in the bottom layer equally spaced about the hole in the top. The size of the vents may vary; however, the size of the top layer vent may be greater than the size of the bottom layer vent.

The dimensions of the material may be varied to achieve a desired result in terms of hardness and durability. In one embodiment, the dimensions of the material are calibrated in this respect to a desired durometer or dimensions to fit a particular application. For example, the material for a helmet used in football may have a different durometer reading than a helmet used for baseball. The cushioning material in the youth's helmet or any other product may have a different durometer reading than an adult's helmet or other product, because of age, size, and/or weight to maximize the benefit for the individual and/or the activity involved. The material for the adults, for example, may be harder than the material for children. The material and the helmets may therefore be customized for the particular application and/or individual.

The materials disclosed herein may be combined with other energy absorbing material, for example, to provide a feel that a wearer is accustomed to. For example, a bicycle helmet may include Styrofoam sections that come into direct contact with the wearer to mirror the feel of conventional bicycle helmets. Similarly, the material may be covered with a felt fabric and/or foam to provide greater comfort for the wearer.

Figure 16A:
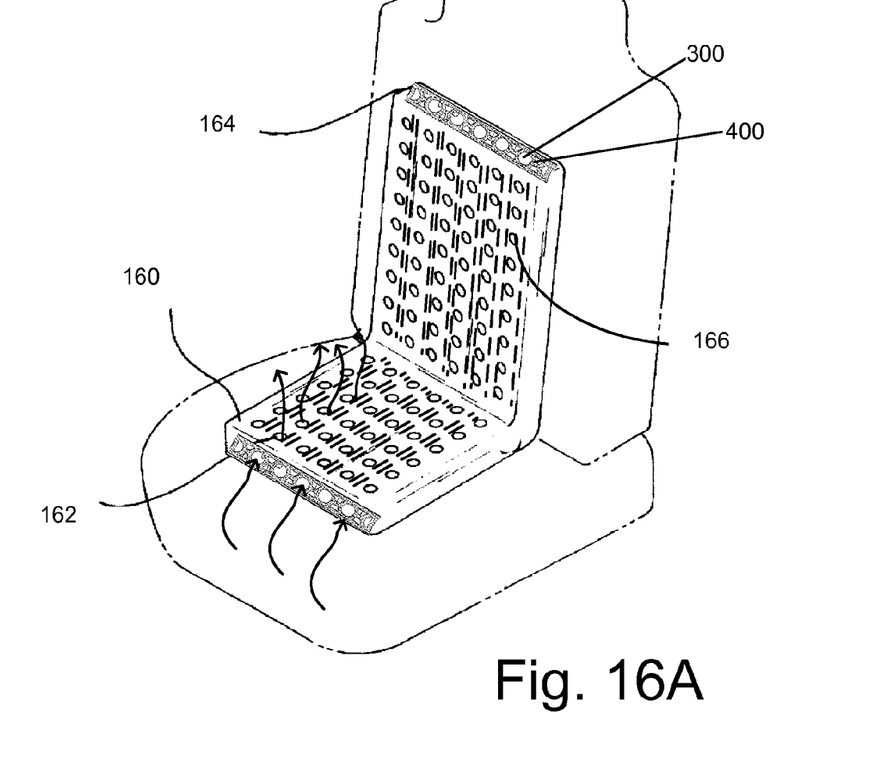
FIGS. 16A-B and D are perspective views of a ventilated seat using a shock absorbing material in accordance with at least one embodiment of the materials disclosed herein.

As noted herein, the material may be used in other applications. Referring to FIG. 16A, the material may be used as a cushion in a seat, such as an automotive seat, a theatre seat, or any other type of seating. That is, the material 160 may be disposed within the seat to provide comfortable support to the user. The material 160 may be installed in the seat portion and/or the seat back portion of the seat. The material 160 may further include vents 166 therein that communicate with the voids or channels 300 between the ribs 400 in the material 160. The seat cover disposed over the material 160 may be perforated to essentially match the vents 166 in the material 160. Ventilation may be achieved therewith by allowing air to pass through the voids from one or more of the ends 162, 164 of the material 160 and exit through the vents 166. The ends of the material may be connected to the air conditioning and/or heating system of the vehicle or a standalone unit to provide cool and/or warm air to the passengers of the vehicle. The seats with the material therein may be original equipment or retrofit in existing vehicles. In the later, the material 160 may be installed in a seat cover that fits over complete seats. The seat cover may include a feeder tube or other conduit that connects the voids of the material to the vehicle or standalone ventilation system.

Figure 16B:
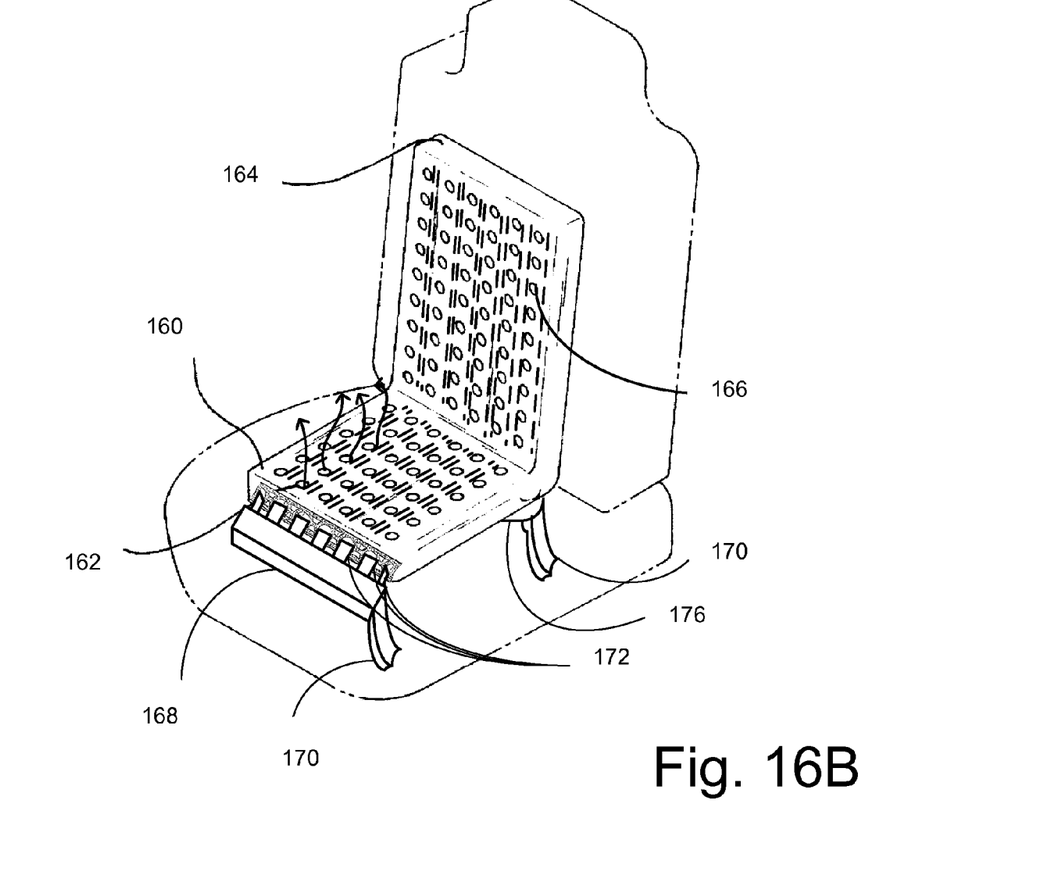
Figure 16C:
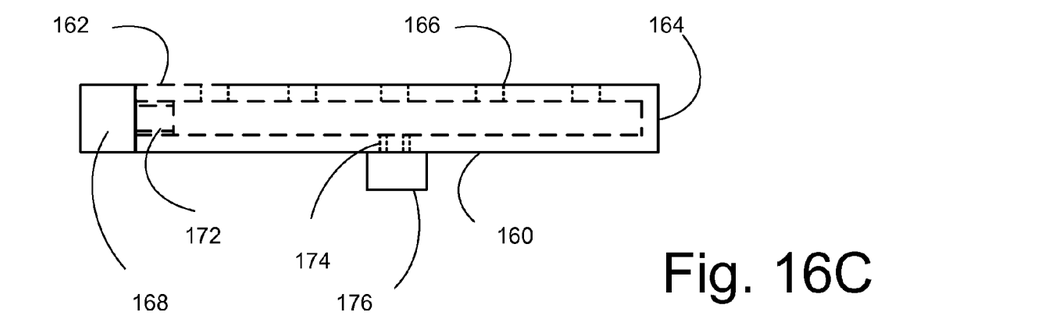
FIG. 16C is a side view of a shock absorbing material for use in a ventilated seat in accordance with at least one embodiment of the materials disclosed herein.

Referring to FIG. 16B, the material 160 may be connected to the vehicle or a separate air conditioning and/or heading system with a feeder tube 170. The feeder tube 170 may be coupled to the voids or channels in the material 160 with nipples 172. The feeder tube 10 and the nipples 172 may be coupled to each other with a manifold 168. A plurality of nipples 172 in a row are preferably bonded, e.g., with adhesive, to the openings in the material 160 at least one of the ends 162, as shown in FIG. 16C. The opposite end 164 is preferably blocked so that all of the air passing through the voids in the material 160 exits through the vents 166. The material may also include a drain hole therein for any condensation to exit the voids in the material 160. Ideally the material includes perforations only on the use side of the material to that condensation running through the channels does not penetrate to the other side of the material.

In the embodiment shown in FIG. 16B, the material 160 runs along the seat and the seat back portions of the seat beginning at or near the front of the seat and extending in a single piece at or near the tope of the seat back. In this instance, air may be forced from the front end of the seat or from any other point in the material 160. For example, a row 176 of nipples 174 may be inserted from the bottom of the material so that the nipples 174 perforate the wall of the circular channels of the material 160, as shown in FIG. 16C, at the point in the seat where the seat portion meets the seat back portion. Air may also be forced into the material 160 from opposite ends of the material. In this instance, some of the nipples 172 may be inserted in a row on one end while another row of nipples 172 is inserted on the opposite end near the point where the seat portion and the seat back portion meet. The nipples 172 in a row may be inserted in every other opening in the material 172 so that the air in adjacent channels flows in opposite directions. Each of the rows may be coupled to the air conditioner separately to provide separate zones in a single material 160.

A plurality of materials 160 may also be installed in the seat each in a different location. For example, a first material 160 may be installed in the seat portion and a second material 160 may be installed in the seat back portion of the seat. In this instance, each of the materials 160 may be coupled to the air conditioner separately. This beneficially allows the seat to provide at least two zones of air conditioning in the seat, one zone for each material.

Figure 16D:
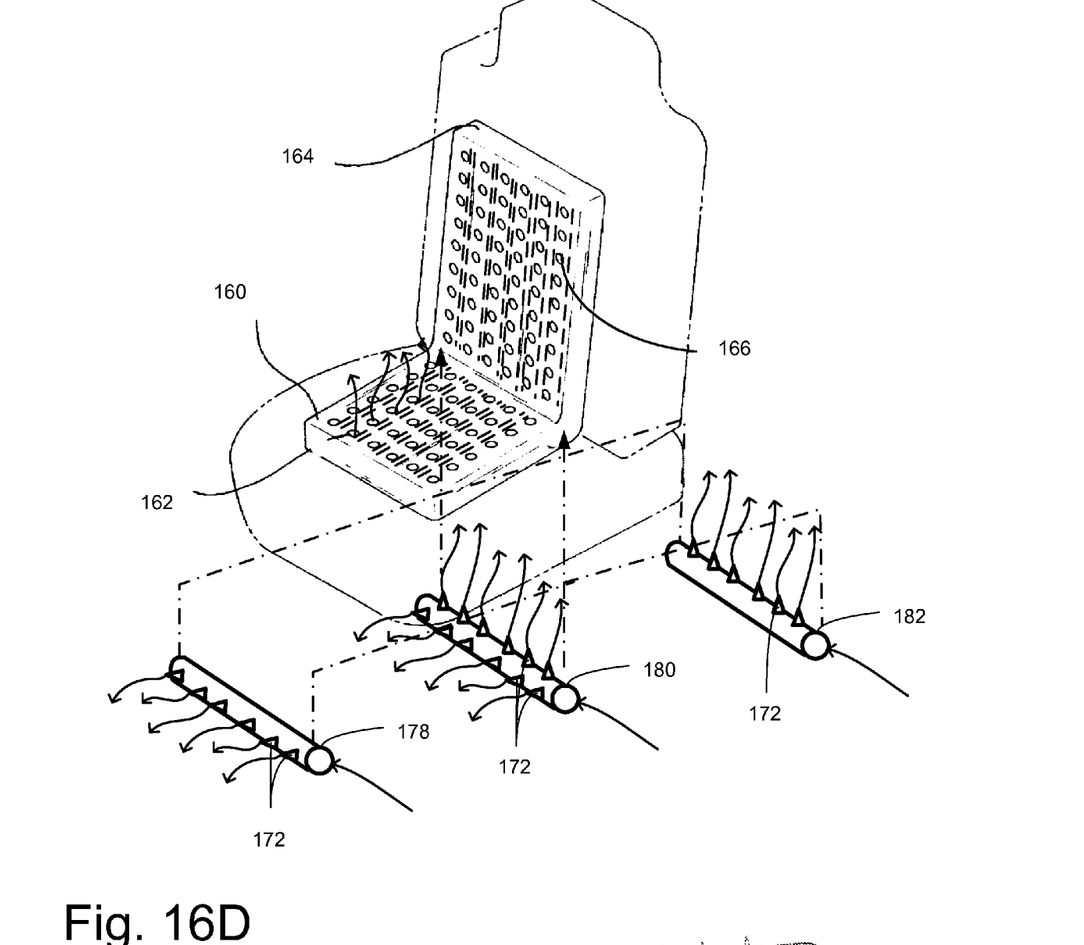
Figure 16E:
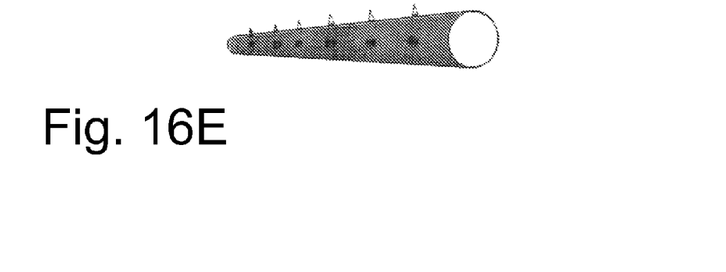
FIG. 16E is a perspective view of a ventilation manifold for use in a seat using a shock absorbing material in accordance with at least one of the embodiments of the materials disclosed herein.

Referring to FIG. 16D, in one embodiment, the air conduit or manifold 178, 180, or 182 that supplies heated or cooled air to the material 160 is positioned in the crotch of the seat where the seat portion meets the seat back. Conduit 178, 182 can have one row of nipple or conduit 180 may have two rows of nipples for insertion into the circular channels of the material 160. That is, one of the rows of the conduit 178 may feed the material extending through the seat portion and/or one of the rows of the conduit 182 may feed that material extending through the seat back. If two separate strips of material are used, e.g., one for the seat portion and one for the seat back, then one can position the nipples on the conduit 172 90 degrees from each other, as shown in FIG. 16E, and the nipples would be fixed in place directly into the channels of the material. If a single strip of material is used for both of the seat and the seat back then a single row of nipples may be inserted thru one of the outer walls of the material, directly into the channels in the material.

In this respect, the material 160 provides ventilation with comfortable support for the passengers of the vehicle. The material 160 may be installed in the seat in such a way to tailor the support that the material 160 provides. For example, the material 160 may be disposed so that the ribs extend from the front to the back of the seat portion or in the reverse. Similarly, the material 160 may be disposed so that the ribs extend from the top to the bottom of the back portion or in the reverse. Multiple layers may also be used as discussed herein. The size of the vents may vary to provide air in different velocities at certain portions of the seat. For example, larger holes may be provided in the seat as opposed to the seat back. Providing air conditioning to occupants locally as discussed herein beneficially uses less energy to keep occupants of the vehicle comfortable than blowing air into the vehicle. In this respect, the ventilation system reduces the load on the vehicles engine or electric motor, which allows designers to specify smaller displacement, more fuel efficient engines or motors in new cars.

Figure 17:
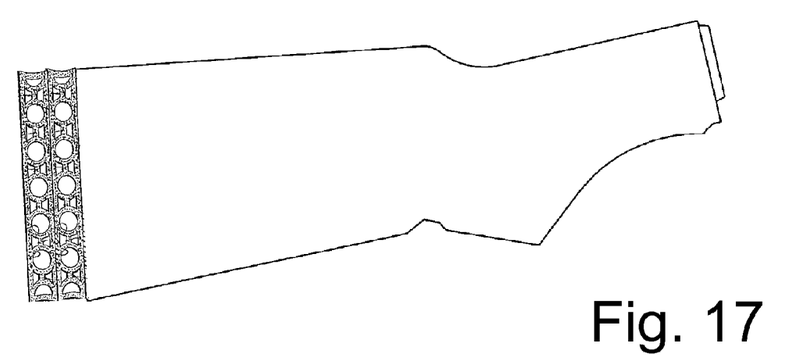
FIGS. 17-18 are side views of a gun stock using a shock absorbing material in accordance with at least one embodiment of the materials disclosed herein.
Figure 18:
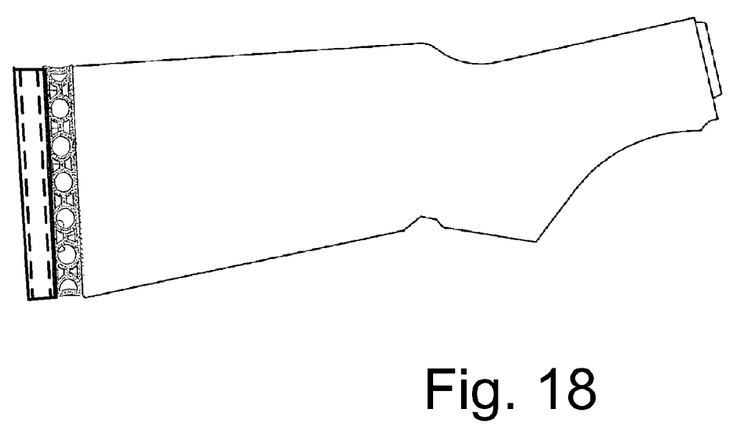

The material may also be installed on the butt end of a gun stock to absorb the recoil energy from the gun when it is fired as shown in FIGS. 17 and 18. That is, one or more layers of the material may be attached to the tail end of the gun so that the ribs of the material extent longitudinally, laterally, diagonally, or a combination thereof. In the embodiment of FIG. 17, two layers of the material are installed on the end of the gun stock so that the ribs of both layers extend laterally. Although the ribs of the material are shown disposed inline with each other, the ribs may also be staggered to tailor the feel of the material as desired. In the embodiment of FIG. 18, one of the layers extends laterally while the other extends longitudinally.

As noted above, the material may be installed as or in a sole in a shoe. The material may be installed in a sole having a first cavity with a depth essentially the thickness of a layer of the material and a second cavity in the heel portion with a depth essentially twice the thickness of the material. In this instance, a first section of the material may be installed in the heel and a second section of the material may be installed on top of the first section to provide extra shock absorption in the heel of the sole. The second section preferably extends over essentially the entire length and/or width of the cavity within the sole. The layers of the sections of the material may be installed so that the ribs of the material extent longitudinally, laterally, diagonally, or a combination thereof. That is, the ribs in one of the sections may run in a first direction while the ribs in another of the sections extend in a different direction.

While the foregoing invention has been described in some detail for purposes of clarity and understanding, it will be appreciated by one skilled in the art, from a reading of the disclosure, that various changes in form and detail can be made without departing from the true scope of the invention in the appended claims.

What is claimed is:

1. A ventilated seat comprising:
   a seat portion;
   a back portion adjustably hinged to the seat portion, at least one of the seat and the back portions comprising a planer sheet of shock absorbing material located therein, the shock absorbing material having a top layer, a bottom layer, and a plurality of pairs of ribs that couple the top layer to the bottom layer, the pairs of ribs extend through the material so as to create a plurality of channels therein, the top layer having a plurality of perforations therein that communicate with the plurality of channels, each of the plurality of channels having an opening on an end of the material coupled to an air source that cause air to pass through the openings of the channels and exit through the perforations in the material, wherein the seat portion and the back portion comprise one or more layers of material, the plurality of channels in the material extend continually from a front of the seat portion to a top of the back portion; and
   a feeder tube having a plurality of nipples, each of the nipples interface with openings on the bottom layer of the material, the feeder tube coupled to the air source, the channels closed at a first end of the material at the front of the seat portion and at a second end of the material at the top of the back portion, therewith allowing air passing through the channels and escape only through the perforations in the top layer, wherein the nipples interface with openings on the bottom layer of the material at an intersection of the seat portion with the back portion.

2. The ventilated seat of claim 1, comprising a seat cover located over the material, the seat cover having perforations therein that communicate with the perforations of the material.

3. The ventilated seat of claim 2, wherein a location of the perforations in the seat cover match a location of the perforations of the material.

4. The ventilated seat of claim 1, wherein the air source it at least one of an air conditioner and a heating system.

5. The ventilated seat of claim 1, wherein the ventilation portion of the seat is a seat cover that fits over a complete seat.

6. The ventilated seat of claim 1, comprising a feeder tube having a plurality of nipples, each of the nipples interface with an opening on the end of the material, the feeder tube coupled to the air source.

7. The ventilated seat of claim 1, wherein the channels traverse the material from a first end to a second end, and wherein the openings in the channel are at a first end and at the second end the channels are closed therewith allowing air passing through the channel and escape only through the perforations in the top layer.

8. The ventilated seat of claim 1, the material having a drain for at least one of the channels.

9. The ventilated seat of claim 1, wherein each of the ribs of the pair of ribs is bowed oppositely with respect to another of the pair of ribs, therewith creating alternating shaped channels.

10. The ventilated seat of claim 9, wherein at least one channels of the alternating shaped channels has a circular cross sectional shape.

11. A ventilated seat comprising:
    a seat portion;
    a back portion adjustably hinged to the seat portion, at least one of the seat and the back portions comprising a planer sheet of shock absorbing material located therein, the shock absorbing material having a top layer, a bottom layer, and a plurality of pairs of ribs that couple the top layer to the bottom layer, the pairs of ribs extend through the material so as to create a plurality of channels therein, the top layer having a plurality of perforations therein that communicate with the plurality of channels, each of the plurality of channels having an opening on an end of the material coupled to an air source that cause air to pass through the openings of the channels and exit through the perforations in the material, wherein the seat portion and the back portion comprise one or more layers of material, a first layer of material is located in the seat portion and a separate second layer of material is located in the back portion, the plurality of channels in the material extend from a front of the seat portion to a back of the seat portion, and from a bottom of the back portion to a top of the back portion; and
    a feeder tube having a first set of a plurality of nipples and a second set of a plurality of nipples, each of the sets of nipples interface with openings in one of the layers of materials, the feeder tube coupled to the air source, the channels closed at a front of the seat portion and at a top of the back portion, therewith allowing air passing through the channels and escape only through the perforations in the top layer, wherein the nipples interface with openings on the bottom layer of the material at an intersection of the seat portion with the back portion.

12. The ventilated seat of claim 11, comprising a seat cover located over the material, the seat cover having perforations therein that communicate with the perforations of the material.

13. The ventilated seat of claim 12, wherein a location of the perforations in the seat cover match a location of the perforations of the material.

14. The ventilated seat of claim 11, wherein the air source it at least one of an air conditioner and a heating system.

15. The ventilated seat of claim 11, wherein the ventilation portion of the seat is a seat cover that fits over a complete seat.

16. The ventilated seat of claim 11, the material having a drain for at least one of the channels.

17. The ventilated seat of claim 11, wherein each of the ribs of the pair of ribs is bowed oppositely with respect to another of the pair of ribs, therewith creating alternating shaped channels.

18. The ventilated seat of claim 17, wherein at least one channels of the alternating shaped channels has a circular cross sectional shape.

* * * * *